United States Patent
Kampmann

(10) Patent No.: US 8,839,727 B2
(45) Date of Patent: Sep. 23, 2014

(54) TEXTILE

(75) Inventor: Jürgen Kampmann, Bielefeld (DE)

(73) Assignee: Kampmann GmbH, Bielefeld (DE)

( * ) Notice: Subject to any disclaimer, the term of this patent is extended or adjusted under 35 U.S.C. 154(b) by 0 days.

(21) Appl. No.: 13/884,120

(22) PCT Filed: Nov. 4, 2011

(86) PCT No.: PCT/EP2011/069452
§ 371 (c)(1),
(2), (4) Date: Jun. 25, 2013

(87) PCT Pub. No.: WO2012/062661
PCT Pub. Date: May 18, 2012

(65) Prior Publication Data
US 2013/0269580 A1   Oct. 17, 2013

(30) Foreign Application Priority Data

Nov. 10, 2010 (DE) ............. 20 2010 008 998 U

(51) Int. Cl.
*D05C 17/00* (2006.01)
*G09B 21/00* (2006.01)
*D06F 93/00* (2006.01)
*D06H 1/04* (2006.01)

(52) U.S. Cl.
CPC ........... *D05C 17/00* (2013.01); *G09B 21/003* (2013.01); *D06F 93/005* (2013.01); *D06H 1/04* (2013.01)
USPC ........................................ 112/439; 434/113

(58) Field of Classification Search
USPC ................ 112/400, 402, 415, 439, 475.08, 112/475.09, 475.18; 40/299.01; 434/112, 434/113
See application file for complete search history.

(56) References Cited

U.S. PATENT DOCUMENTS

| | | | | |
|---|---|---|---|---|
| 4,608,939 A | * | 9/1986 | Lampley | 434/112 |
| 5,839,215 A | * | 11/1998 | Lasprogata | 40/299.01 |
| 6,263,817 B1 | * | 7/2001 | Tajima et al. | 112/439 |
| 6,481,134 B1 | * | 11/2002 | Aledo | 434/113 |
| 7,021,340 B2 | * | 4/2006 | Mayster | 434/113 |
| 7,134,457 B2 | | 11/2006 | Mayster | |
| 2005/0279660 A1 | | 12/2005 | Deflin et al. | |

FOREIGN PATENT DOCUMENTS

DE     203 07 854    12/2003
GB     1 549 628     8/1979

OTHER PUBLICATIONS

Japanese Patent Abstract No. 09209256 dated Aug. 12, 1997.
German Search Report for Application No. 20 2010 008 998.0, dated Sep. 2, 2011.

* cited by examiner

*Primary Examiner* — Nathan Durham
(74) *Attorney, Agent, or Firm* — Thomas, Karceski & Karmilovich, PC

(57) ABSTRACT

A textile includes a main material layer and an information carrier including haptically detectable information. The information carrier is arranged as an embroidery including Braille dots applied to the main material layer. The embroidery includes a first ply if the Braille dots arranged as a star-shaped stitching that is stitched onto the main material layer and a second ply of the Braille dots is arranged as a first cover stitching ply covering the first ply and stitched onto one or both of the main material layer and the first ply.

6 Claims, 2 Drawing Sheets

TEXTILE

CROSS-REFERENCE TO RELATED APPLICATION

This application is a national stage of International Application PCT/EP2011/069452, filed Nov. 4, 2011, and claims benefit of and priority to German Patent Application No. 10 2010 008 998.0, filed Nov. 10, 2010, the content of which Applications are incorporated by reference herein.

BACKGROUND AND SUMMARY

The present invention relates to a textile including a main material layer including haptically detectable information. The information carrier is arranged as an embroidery including Braille dots applied to the main material layer.

In order to enable blind or visually impaired persons to distinguish textile goods, and clothing in particular, from each other concerning their color, size, designation or also washing capability or the like, it is known from DE 203 07 854 U1 to fix a protective sleeve to the inside of the garment in which a writing medium is inserted with information in Braille on the properties of the garment. The writing medium inserted into the protective sleeve consists of a plastic or a metal, or even of pressed, glued or woven natural fibres. It is also known from this DE '854 specification to emboss or punch the Braille into the writing medium or to also apply the same by coating of the writing medium with solidifying substances by gluing or soldering individual points or by stitching small pearls onto the writing medium.

It is disadvantageous in that such writing media introduced into protective sleeves can fall out of the protective sleeves or can be inserted into another garment after the removal from the protective sleeve, the nature of which does not correspond to the information contained on the writing medium. Furthermore, both the protective sleeve and also the writing medium or letters, which may consist of hard material, will impair the wearing comfort of the garment.

Embodiments of the present invention provide for a textile with haptically detectable information which is captively attached to the textile and does not impair the wearing comfort of the textile.

Embodiments of the present disclosure are directed to a textile including a main material layer and an information carrier including haptically detectable information. The information carrier is arranged as an embroidery including Braille dots applied to the main material layer. The embroidery includes a first ply if the Braille dots arranged as a star-shaped stitching that is stitched onto the main material layer and a second ply of the Braille dots is arranged as a first cover stitching ply covering the first ply and stitched onto one or both of the main material layer and the first ply.

In accordance with embodiments of the present disclosure, the information carrier of the textile is arranged as an embroidery of Braille dots that is applied to the main material layer of the textile. The embroidery has a multi-ply design and includes a first ply which is arranged as a star-shaped stitching that is stitched onto the main material layer, and a second ply that is arranged as a first cover stitching ply that covers the first ply and is stitched onto the main material layer and/or the first ply.

As a result of the Braille dots arranged on the textile as an embroidery, a unique and non-detachable textile, such as a garment or a cloth bag, is enabled, which, in the case of application to a textile arranged as a garment, can be carried pleasantly on the skin at the same time.

Reliable detection of the individual Braille dots is enabled by stacking several layers of embroideries.

Embodiments of the present disclosure are also discussed in the appended claims.

In accordance with an embodiment of the present disclosure, the second ply of the embroidery is covered by a further third cover stitching ply, wherein the second ply and the third ply are embroidered above one another in an interlaced manner.

In order to ensure reliable detectability of the embroidery of Braille dots even on pile fabric such as velvet and terry fabric or knitted fabrics such as knitwear, an embroidered lock-stitch area is provided, in accordance with an embodiment of the present disclosure, between the main material layer and the embroidery of Braille dots. This lock-stitch area includes a smooth surface, so that the Braille dots embroidered onto the lock-stitch area can be detected easily.

In accordance with a another embodiment of the present disclosure, a black print embroidery, which corresponds to the meaning of the embroidery in Braille dots, is stitched adjacent to the embroidery of Braille dots onto the main material layer. This is in order to provide that the information applied to the textile in Braille dots is also in readable form for visually impaired persons with residual visual acuity.

Other aspects of the present disclosure will become apparent from the following descriptions when considered in conjunction with the accompanying drawings.

DETAILED DESCRIPTION

In a discussion of the drawings below, terms such as above, below, left, right, front, rear, for example, relate exclusively to the exemplary illustration and position of the textile and the embroidery as shown in the respective drawings. These terms shall not be understood as being limiting in any way, meaning that such references can change by different working positions, for example.

Figure 1:
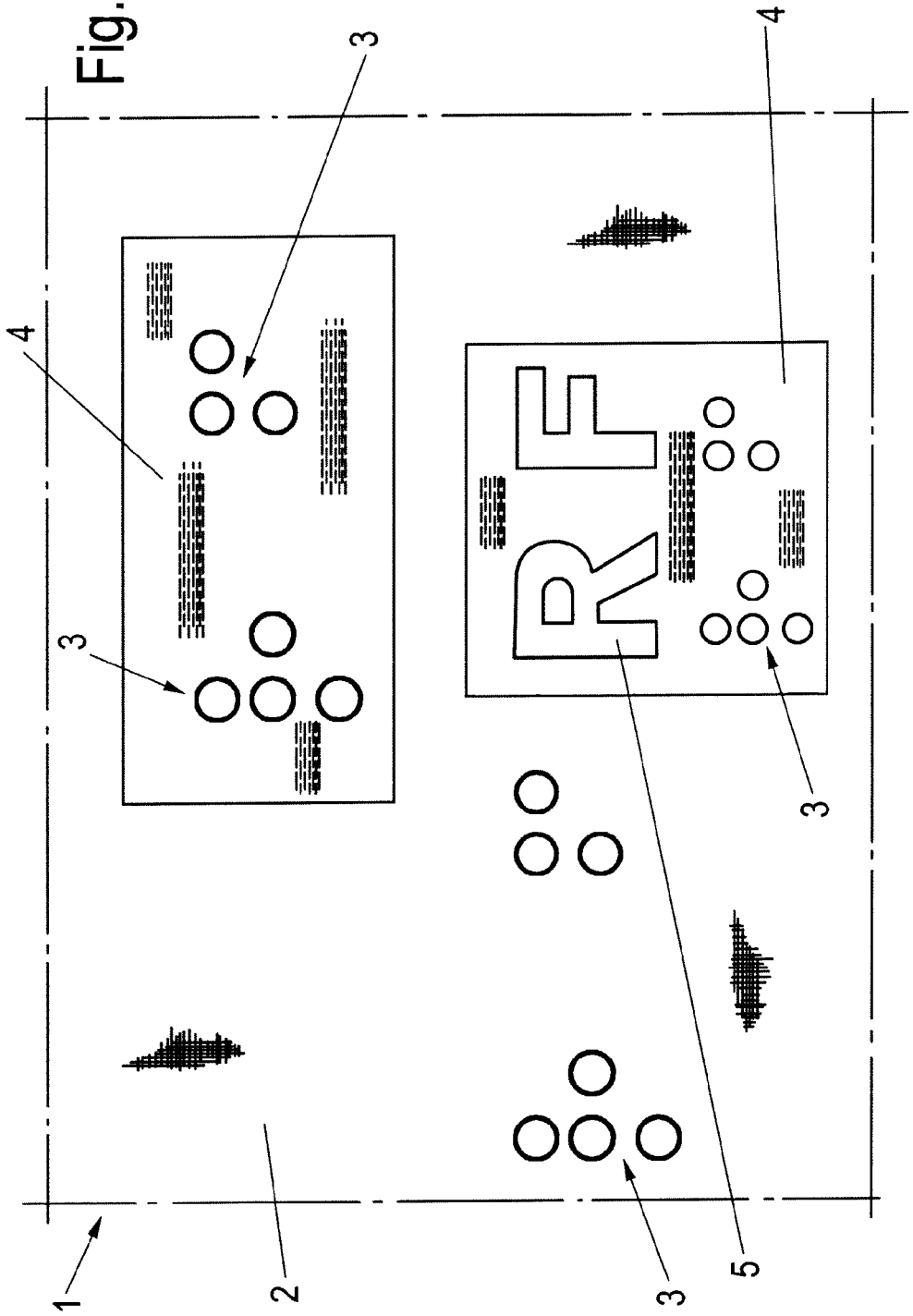
FIG. 1 shows a schematic top view of a textile item with Braille dot embroideries applied thereto, in accordance with an embodiment of the present disclosure.

FIG. 1 shows a textile in its entirety and is identified by reference numeral 1. This textile 1 has a main material layer 2, for example, in the form of a fabric or knitted fabric on which an embroidery 3 of Braille dots is stitched. The embroidery 3 of Braille dots can, for example, be applied both directly to the main material layer 3 and also to a lock-stitch area 4 which is stitched onto the main material layer 2. The lock-stitch area 4 can, for example, be used when the main material layer 2 includes an unlevel fabric or knitted fabric such as knit fabrics, terry fabrics, piqué, velvet or corduroy in which the Braille dots would not protrude in a sufficiently elevated manner from the remaining area of the textile and could therefore only be detected by a blind person with difficulty.

Furthermore, a black print embroidery 5 is stitched, according to an embodiment of the textiles in accordance with the present disclosure, adjacent to the embroideries of Braille dots. The black print embroidery corresponds with respect to the content of the embroidery to the Braille dots in order to provide the information applied to the embroidery in Braille dots in readable form also for visually impaired persons with residual visual acuity.

The embroidery 3 of Braille dots is arranged to be elevated, for example, by at least 0.4 mm above the material surface of the main material layer 2 in order to ensure the minimum requirements placed on the "height of the letters" for the readability of Braille.

Figure 2:
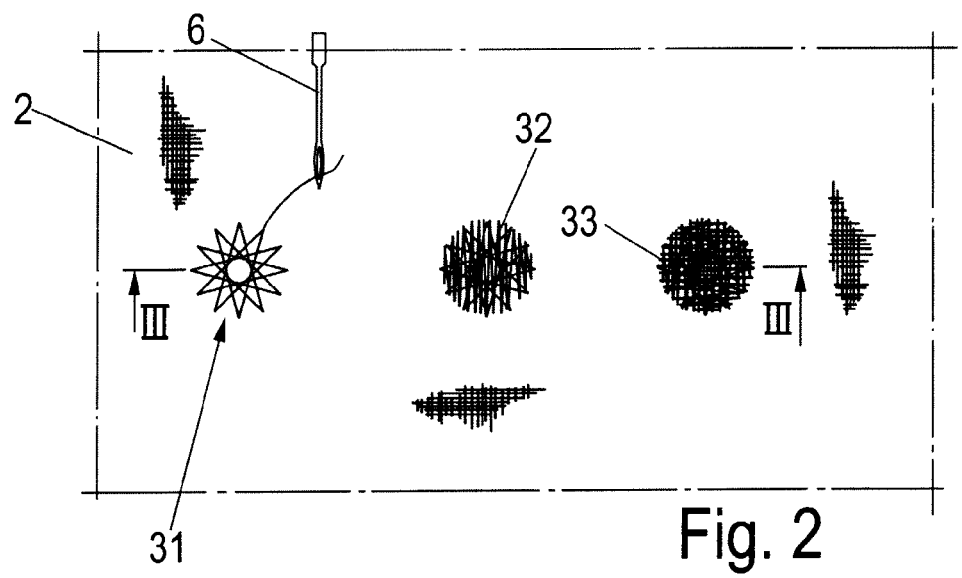
FIG. 2 shows a schematic view of a main material layer with adjacently arranged different production steps of Braille dots embroideries, in accordance with an embodiment of the present disclosure.
Figure 3:
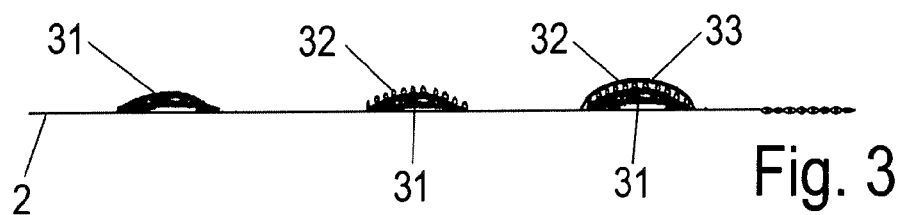
FIG. 3 shows a lateral sectional view of the textile item of FIG. 2 along a section in FIG. 2 marked III-III.
Figure 4:
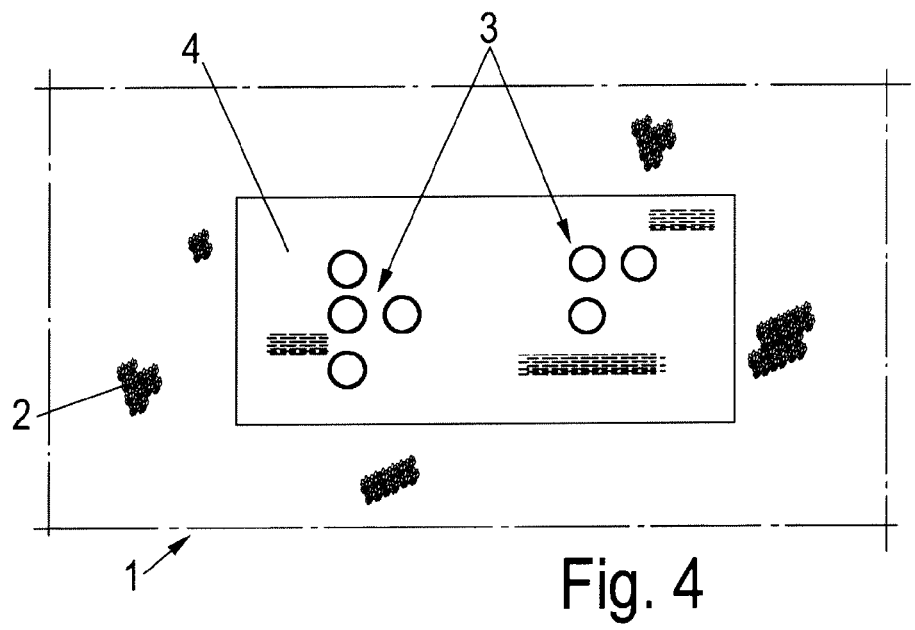
FIG. 4 shows a schematic view of a textile with a main material layer which is arranged as a terry product and a lock-stitch area as a base for the embroidery of Braille dots, in accordance with an embodiment of the present disclosure.

This structure of the individual Braille dots is shown in FIGS. 2 and 3. In the production of the embroidery 3 of the Braille dots, a star-shaped stitching 31 may, for example, be stitched at first onto the main material layer 2 by a stitching tool 6 in a first production step in order to produce an elevated center of the Braille dot to be embroidered. In a second production step, the stitching is covered by stitching a first cover stitching ply 32 of stitchings. For example, the first cover stitching ply 32 may be covered in a further production step by stitching a second cover stitching ply 33 of stitchings onto the first cover stitching ply 32, wherein the second ply 32, that is, the first cover stitching ply, and the third ply 33, that is, the second cover stitching ply will be stitched on in an interlacing fashion with respect to each other.

The Braille dots produced in such a way as just described, may, for example, be arranged as Braille printing.

A simple differentiation of clothing and laundry, for example, in physical education in schools for the blind, in the household of blind persons, in homes or in therapeutic use, will be enabled by the stitched Braille dots. Furthermore, the stitched Braille dots can be used for applying advertising messages aimed at blind persons in a simple manner to textile or leather goods.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A textile comprising:
   a main material layer;
   an information carrier including haptically detectable information, the information carrier arranged as an embroidery including Braille dots applied to the main material layer;
   the embroidery includes a first ply of the Braille dots arranged as a star-shaped stitching that is stitched onto the main material layer and a second ply of the Braille dots is arranged as a first cover stitching ply covering the first ply and stitched onto one or both of the main material layer and the first ply.

2. The textile according to claim 1, further comprising a third ply of the Braille dots arranged as a second cover stitching ply which is stitched onto one or all of the main material layer, the first ply, and the second ply, wherein the second ply and the third ply are stitched above one another in an interlacing manner.

3. The textile according to claim 1, further comprising a stitched lock-stitch area provided between the main material layer and the embroidery including the Braille dots.

4. The textile according to claim 1, wherein the embroidery including the Braille dots has an elevation of at least 0.4 mm.

5. The textile according to claim 1, wherein the Braille dots are arranged such that they are readable as Braille printing.

6. The textile according to claim 1, further comprising a black printing embroidery that is stitched onto the main material layer adjacent to the embroidery of Braille dots, the black printing embroidery corresponding in its meaning to that of the embroidery having the Braille dots.

* * * * *